Oct. 8, 1940.    G. E. MacMANNUS    2,216,823
ELECTRIC CIRCUIT CONTROLLING DEVICE
Filed Jan. 4, 1938    2 Sheets—Sheet 1
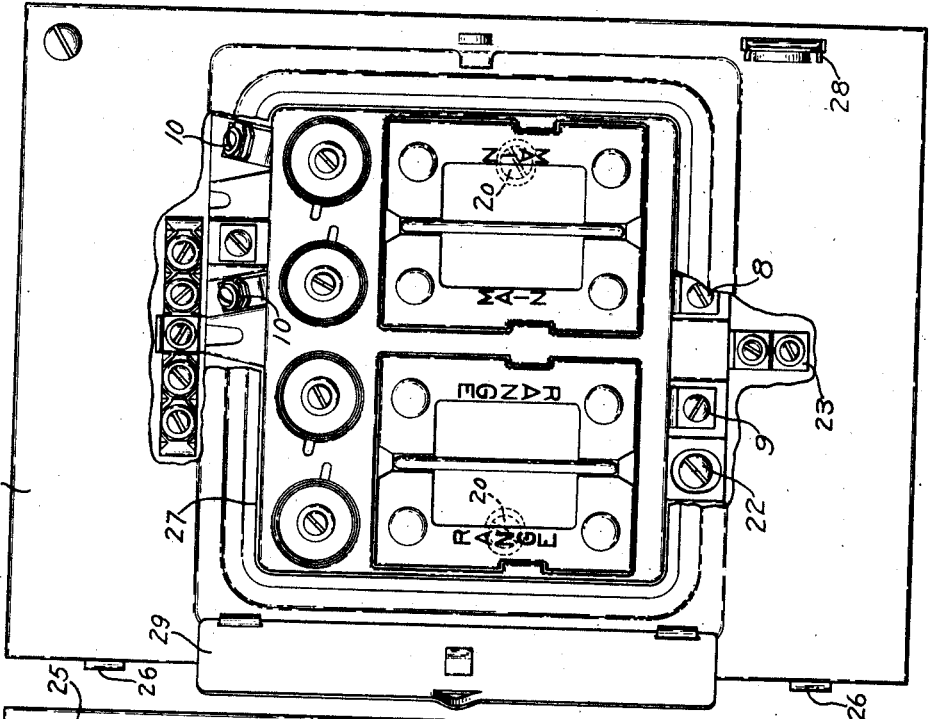
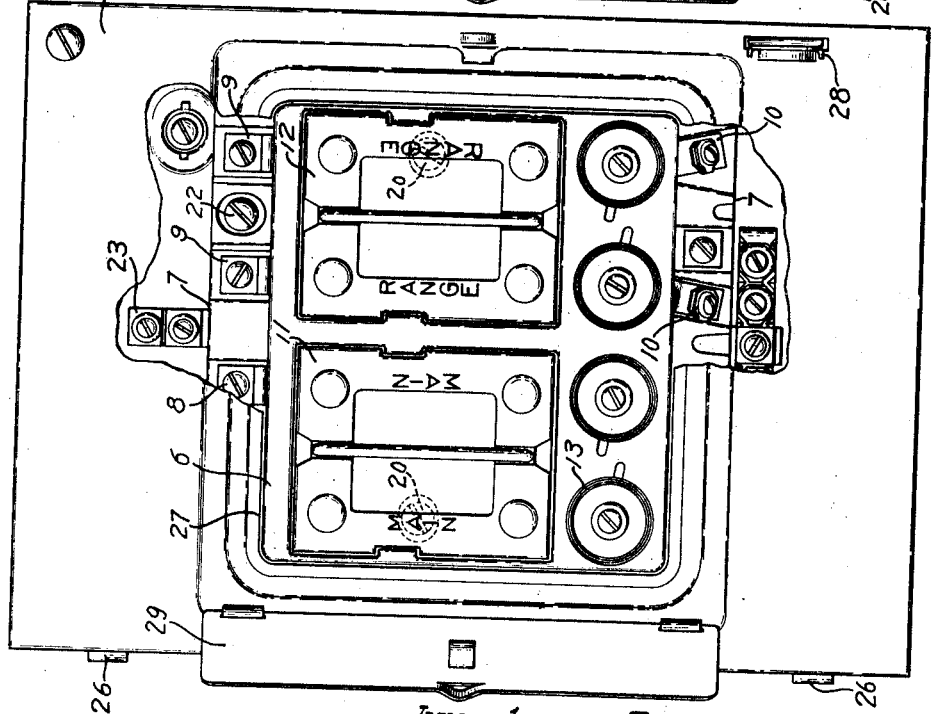
Inventor: George E. MacMannus
By J. Jay Teller
Attorney Oct. 8, 1940.                G. E. MacMANNUS                2,216,823
                    ELECTRIC CIRCUIT CONTROLLING DEVICE
                         Filed Jan. 4, 1938            2 Sheets-Sheet 2
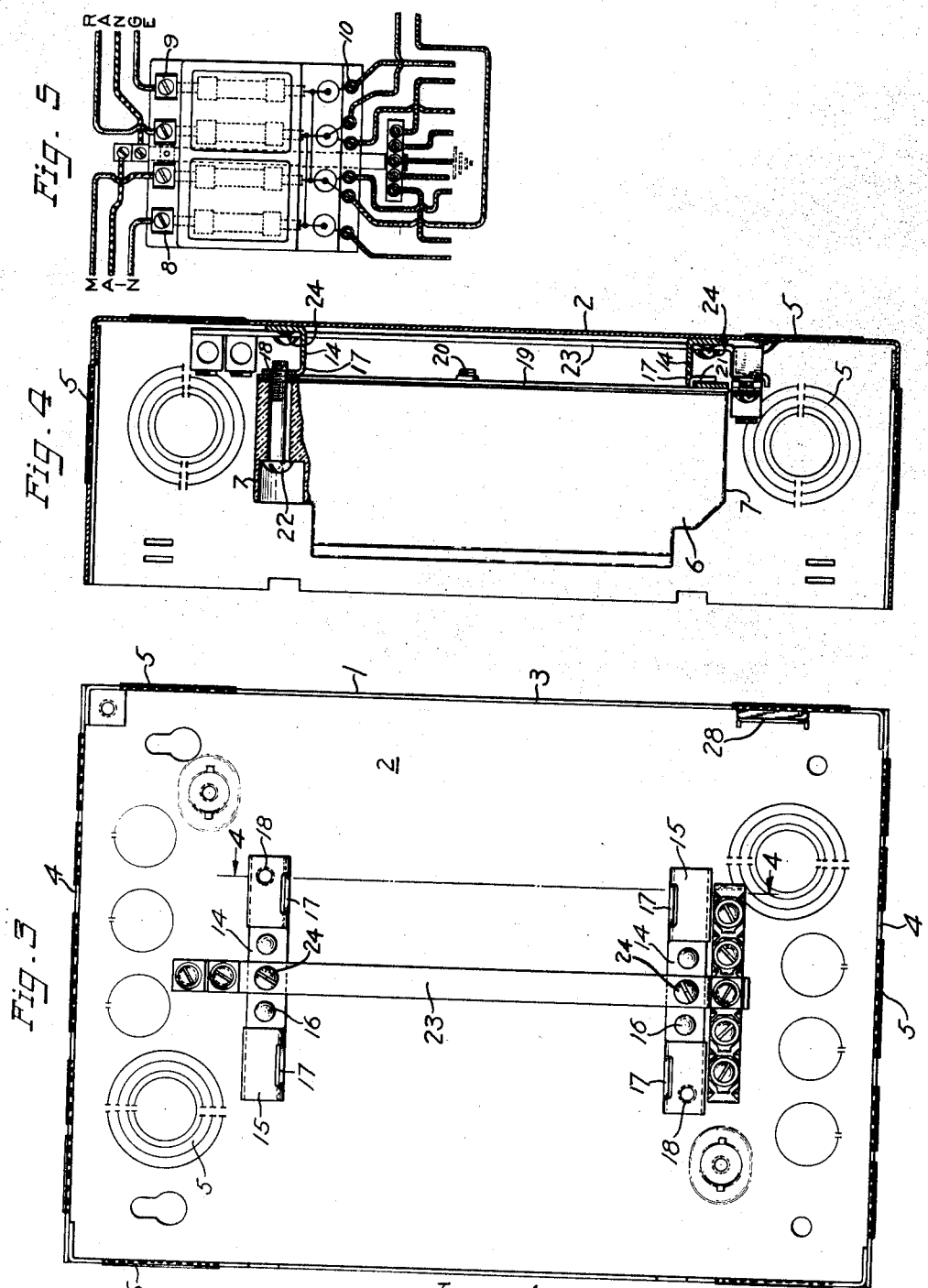
Inventor: George E. MacMannus
By S. Jay Teller
Attorney Patented Oct. 8, 1940

2,216,823

UNITED STATES PATENT OFFICE 2,216,823

ELECTRIC CIRCUIT CONTROLLING DEVICE

George E. MacMannus, West Hartford, Conn., assignor to Colt's Patent Fire Arms Manufacturing Company, Hartford, Conn., a corporation of Connecticut Application January 4, 1938, Serial No. 183,389

3 Claims. (Cl. 175—307)

The invention relates to a circuit controlling device, and more particularly to a device that is adaptable to various physical conditions which may be encountered in different electrical installations. Sometimes it is necessary to bring the service wires into the bottom of a circuit controlling means and lead the load wires from the top, and then again it may be necessary to just reverse this. Furthermore, circuit controlling means are commonly mounted on insulating blocks, the blocks being in turn secured in sheet metal casings, and considerable difficulty is frequently encountered in leading the wires into and out of the casing with the block in place therein.

In accordance with the invention, the casing and the block upon which a main circuit switching member and circuit controlling means are mounted are provided with cooperating means of such a character that the block may be semipermanently mounted in the casing in more than one position so as to be adapted to have service wires enter the casing at the top or bottom, and furthermore, the cooperating means on the casing and block are preferably such that the block may be readily removed and replaced in the casing to facilitate wiring operations. In accordance with a more specific aspect of the invention, the construction provided is such that the block may be adequately and releasably secured in the casing by but a single manually operable means.

The objects and advantages of the invention will be apparent to those skilled in the art from this specification.

In the accompanying drawings I have shown one embodiment of the invention, but it will be understood that the drawings are intended for illustrative purposes only and are not to be construed as defining or limiting the scope of the invention, the claims forming a part of this specification being relied upon for that purpose.

In the drawings:

Fig. 1 is a front elevation of a device embodying the principles of the invention, the auxiliary cover being shown in open position and a portion of the main cover being broken away.

Fig. 2 is a view similar to Fig. 1 with certain parts shown in another position.

Fig. 3 is a front elevation of the casing with the main cover and block omitted.

Fig. 4 is sectional view taken on the line 4—4 of Fig. 3 but with the block in place.

Fig. 5 is a wiring diagram showing one possible manner of using the device of Fig. 1.

In the illustrated embodiment of the invention a casing 1 is provided which comprises a rear wall 2, side walls 3, and end walls 4. At least two of these walls are provided with knockouts. In the drawings the rear, side, and end walls are all provided with knockouts 5.

The circuit controlling means per se may be of any desired type, but for the purposes of this specification I have illustrated a fuse block of the type shown in the Sachs Patent No. 2,074,816. This construction comprises an insulating block 6 having edge surfaces 7 adjacent which are mounted circuit connectors 8, 9, and 10. The block is recessed to receive removable combined switching and fuse carrying members 11 and 12. The block also has other fuse receiving members 13 mounted thereon which are adapted to receive additional circuit controlling fuses. In the particular block illustrated the electrical connections are such (see Fig. 5) that the circuit connectors 8, 9, and 10 constitute main, range, and branch connectors, respectively. The fuses mounted in the carriers 11 and 12, and in the fuse receiving means 13 constitute main, range, and branch circuit fuses, respectively. The block preferably carries means such as electrical conductors for connecting the branch fuses with the main fuses, the conductors and connections being schematically indicated in Fig. 5.

The block and casing are provided with cooperating mounting means of the character above noted. I have shown the form of cooperating means which I now deem preferable, although it should be understood that other functionally equivalent means may be used if desired.

In the now preferred construction two members 14 having channel shaped ends 15 are rigidly secured, by rivets 16 for example, to the inner surface of the rear wall 2 of the casing. The end portions 15 are apertured at 17 and each member 14 is preferably provided with a screw threaded hole 18.

A plate 19 is secured to the rear surface of the block 6 by screws 20. With a construction which includes two positioning members such as 14, rearward projecting hook members 21 on the plate 19 which are alternatively engageable with the apertures 17 in the portions 15 may be provided, it being apparent that the hook members 21 when received in the apertures 17 hold the block against forward removal from the casing. The block may be removed after being moved longitudinally of the casing sufficiently to disengage the hook members from the portions 15. Preferably, although not necessarily, a single manually operable means is provided for releasably securing the block in the casing in either of its two positions. As shown, a single screw 22 adapted to be threaded into either of the holes 18 may be provided for securing the block in place. While I have shown a construction providing for 180° rotation of the block, it should be understood that other angularities may be provided for if desired.

A solid neutral 23 is preferably provided which includes the requisite number of circuit connectors. The neutral is preferably detachably secured in the casing by means such as screws 24. This permits the position of the neutral to be changed to conform to the position of the block 6.

Means is provided which, when in normal position, protectively covers at least that portion of the block 6 upon which the circuit connectors 8, 9, and 10 are mounted without covering the circuit controlling means. This covering means, the casing, and the block are preferably so related that the covering means functions as just described irrespective of which of its positions the block may occupy. While other means may be used for this purpose, I have illustrated a simple, yet effective, construction which I now prefer. A main cover 25 is openably associated with the casing by the hinges 26 and it has an aperture 27 therein of substantial size. As may be readily seen in Figs. 1 and 2, the block 6 is in alignment with the aperture 27 when the block is in either of its two positions, and the cover 25 when closed serves to protectively cover the circuit connectors without covering the circuit controlling means due to the fact that the members 14 are diametrically and symmetrically located relative to the aperture 27. A spring latch 28 may serve to hold the cover 25 closed and means, such as an auxiliary hinged cover 29, may be provided for closing the aperture 27.

It will be readily understood that the block 6 may be removed from the casing by simply removing the single screw 22 and lifting the block so as to disengage the hooks 21 from the members 14. With the block removed the casing may be easily wired after which the block may be again semi-permanently mounted in the casing in either of its positions depending upon the wiring.

Other embodiments of the invention disclosed will be readily apparent to those skilled in the art, and I do not mean to limit myself to any particular embodiment except as defined in the claims.

What I claim is:

1. In combination, a casing having knockouts therein at opposite ends of the casing, an insulating block mounted in the casing, a switching member carried by the block, main circuit controlling means carried by the switching member, branch circuit controlling means mounted on the block, means carried by the block for electrically connecting the branch circuit controlling means to the main circuit controlling means, main and branch circuit connectors mounted on said block respectively adjacent opposite end surfaces thereof, cooperating means in the casing and on the block for positioning the block within the casing in either of two positions, releasable means for preventing removal of said block from the casing when positioned therein, and an openable cover on said casing which when closed protectively covers said circuit connectors and prevents access to said releasable means, said cover having an aperture therein exposing said branch circuit controlling means when the cover is closed.

2. In combination, a casing having knockouts therein at opposite ends of the casing, an insulating block mounted in the casing, main and branch circuit controlling means carried by the block, main and branch circuit connectors mounted on said blocks respectively adjacent opposite end surfaces thereof, two members fixedly secured in said casing and having apertures therein, a hook member projecting rearward from said block and alternatively engageable in the apertures in said two members for positioning the block within the casing in either of two positions, releasable means for securing said block within the casing in either of said two positions, and an openable cover on said casing which when closed protectively covers said circuit connectors and prevents access to said releasable means, said cover having an aperture therein exposing said branch circuit controlling means when said cover is closed.

3. In combination, a casing including at least two walls having knockouts therein and an openable cover having an aperture of substantial size therein, an insulating block having circuit controlling means mounted thereon, and cooperatively engageable hook and hook receiving members in the casing and on the block for positioning the block within the casing in either of two positions in alignment with the aperture in said cover when closed so as to expose said circuit controlling means and for preventing forward and backward movement of the block relative to the casing when in either of the said two positions, and a single screw for securing the block in the casing in either of the said two positions, said block being free for removal from the casing upon removal of said single screw.

GEORGE E. MacMANNUS.